(12) United States Patent
Miller et al.

(10) Patent No.: US 9,002,114 B2
(45) Date of Patent: Apr. 7, 2015

(54) METHODS, APPARATUS, AND ARTICLES OF MANUFACTURE TO MEASURE GEOGRAPHICAL FEATURES USING AN IMAGE OF A GEOGRAPHICAL LOCATION

(75) Inventors: David Miller, Annadale, VA (US); Pawel Mikolaj Bedynski, Oxfordshire (GB); Mainak Mazumdar, Forest Hills, NY (US); Ludo Daemen, Brussels (BE)

(73) Assignee: The Nielsen Company (US), LLC, Schaumburg, IL (US)

( * ) Notice: Subject to any disclaimer, the term of this patent is extended or adjusted under 35 U.S.C. 154(b) by 234 days.

(21) Appl. No.: 13/314,989

(22) Filed: Dec. 8, 2011

(65) Prior Publication Data
US 2013/0148895 A1 Jun. 13, 2013

(51) Int. Cl.
G06K 9/46 (2006.01)
G06K 9/00 (2006.01)
G06Q 30/02 (2012.01)

(52) U.S. Cl.
CPC .......... G06K 9/0063 (2013.01); G06Q 30/0201 (2013.01); G06K 9/00523 (2013.01)
USPC .......................................... 382/195; 382/204

(58) Field of Classification Search
CPC ............ G06K 9/0063; G06K 9/00523; G06Q 30/0201
USPC ......... 382/113, 168–172, 173, 180, 190, 195, 382/203, 204
See application file for complete search history.

(56) References Cited

U.S. PATENT DOCUMENTS

| | | | |
|---|---|---|---|
| 3,240,138 A | 3/1966 | Goddard | |
| 5,341,439 A | 8/1994 | Hsu | |
| 5,414,462 A | 5/1995 | Veatch | |
| 5,682,525 A | 10/1997 | Bouve et al. | |
| 6,035,255 A | 3/2000 | Murphy et al. | |
| 6,308,177 B1 | 10/2001 | Israni et al. | |
| 6,385,622 B2 | 5/2002 | Bouve et al. | |
| 6,665,449 B1 | 12/2003 | He et al. | |
| 6,970,578 B1 | 11/2005 | Strand | |
| 7,069,232 B1 | 6/2006 | Fox et al. | |

(Continued)

FOREIGN PATENT DOCUMENTS

WO 2013085821 6/2013

OTHER PUBLICATIONS

Krishnamachari, "Hierarchical clustering algorithm for fast image retrieval," Jan. 1999, 9 pages, Part of the IS&T/SPIE Conference on Storage and Retrieval for Image and Video Databases VII, San Jose, California.

(Continued)

Primary Examiner — Brian Le
(74) Attorney, Agent, or Firm — Hanley, Flight & Zimmerman, LLC

(57) ABSTRACT

Methods, apparatus, and articles of manufacture to measure geographical features using an image of a geographical location are disclosed. An example method includes dividing, with a processor, an image of a geographic area of interest into a plurality of geographical zones, the geographical zones being representative of different geographical areas having approximately equal physical areas, measuring, with the processor, a geographical feature represented in the image for corresponding ones of the plurality of geographical zones, storing descriptions for the geographical zones in a computer memory, and storing values representative of the geographical feature of the geographical zones.

16 Claims, 9 Drawing Sheets

(56) References Cited

U.S. PATENT DOCUMENTS

| | | | |
|---|---|---|---|
| 7,107,038 | B2 | 9/2006 | Fitch et al. |
| 7,342,722 | B2 | 3/2008 | White |
| 7,587,276 | B2 | 9/2009 | Gold et al. |
| 7,844,417 | B2 | 11/2010 | Du |
| 7,856,312 | B2 * | 12/2010 | Coombes et al. ............. 701/532 |
| 7,873,524 | B2 | 1/2011 | Wenzlau et al. |
| 8,429,156 | B2 * | 4/2013 | Buchmueller et al. ........ 707/724 |
| 8,489,445 | B1 | 7/2013 | Berg et al. |
| 8,660,383 | B1 * | 2/2014 | Callari et al. ................. 382/294 |
| 2002/0145620 | A1 | 10/2002 | Smith et al. |
| 2003/0101063 | A1 | 5/2003 | Sexton et al. |
| 2004/0005085 | A1 | 1/2004 | Andersen |
| 2004/0260599 | A1 | 12/2004 | Ziegele et al. |
| 2005/0203768 | A1 | 9/2005 | Florance et al. |
| 2006/0100777 | A1 | 5/2006 | Staton et al. |
| 2007/0282665 | A1 | 12/2007 | Buehler et al. |
| 2008/0281695 | A1 | 11/2008 | Whitehead |
| 2009/0164294 | A1 | 6/2009 | Hu et al. |
| 2009/0187464 | A1 | 7/2009 | Bai et al. |
| 2010/0079336 | A1 | 4/2010 | Skibiski et al. |
| 2010/0111374 | A1 | 5/2010 | Stoica |
| 2010/0189312 | A1 * | 7/2010 | Nielsen et al. ................ 382/113 |
| 2012/0079061 | A1 | 3/2012 | Krebs |
| 2012/0094639 | A1 | 4/2012 | Carlson et al. |
| 2013/0004065 | A1 | 1/2013 | Ma |
| 2013/0010299 | A1 | 1/2013 | Bray et al. |
| 2013/0094700 | A1 | 4/2013 | Mellor et al. |
| 2013/0124441 | A1 | 5/2013 | Quaile et al. |
| 2013/0301915 | A1 | 11/2013 | Terrazas et al. |
| 2014/0019302 | A1 | 1/2014 | Meadow et al. |
| 2014/0172560 | A1 | 6/2014 | Satyavolu et al. |
| 2015/0016730 | A1 | 1/2015 | Miller et al. |

OTHER PUBLICATIONS

M.H.B.P.H.Madana, "Improving Land Use Survey Method using High Resolution Satellite Imagery", International Institute for Geo Information Science and Earth Observation (ITC), Mar. 2002, Enschede, The Netherlands, (124 pages).

Krebs et al., "Optimal Prey Selection in the Great Tit (Parus Major)", Animal Behaviour, vol. 25, No. 1, Feb. 1977, (9 pages).

Charnov, Eric L., "Optimal Foraging: Attack Strategy of a Mantid", The American Naturalist, vol. 110, No. 971, Jan.-Feb. 1976, (11 pages).

Charnov, Eric L., "Optimal Foraging, the Marginal Value Theorem", Theoretical Population Biology, vol. 9, No. 2, Apr. 1976, (8 pages).

Smith, Eric Alden, "Anthropological Applications of Optimal Foraging Theory: A Critical Review", Current Anthropology, vol. 24, No. 5, Dec. 1983 (28 pages).

Orun, Ahmet B., "Automated Identification of Man-Made Textural Features on Satellite Imagery by Bayesian Networks", School of Computer Science, University of Birmingham, Birmingham, United Kingdom, Feb. 2004, (6 pages).

Segal, Donald B., "Retail Trade Area Analysis: Concepts and New Approaches", Directions Magazine—All Things Location, Nov. 18, 1998, (10 pages).

U.S. Appl. No. 61/603,756, filed Feb. 27, 2012, (9 pages).

U.S. Appl. No. 61/602,423, filed Feb. 23, 2012, (40 pages).

U.S. Appl. No. 61/644,850, filed May 9, 2012, (53 pages).

U.S. Appl. No. 13/774,790, filed Feb. 22, 2013, (52 pages).

U.S. Appl. No. 13/829,644, filed Mar. 14, 2013, (55 pages).

U.S. Appl. No. 13/829,625, filed Mar. 14, 2013, (52 pages).

Patent Cooperation Treat, "Written Opinion", issued in connection with PCT application PCT/US2012/067414, mailed Feb. 13, 2013 (5 pages).

Patent Cooperation Treat, "International Search Report", issued in connection with PCT application PCT/US2012/067414, mailed Feb. 13, 2013 (5 pages).

U.S. Appl. No. 13/774,784, filed Feb. 22, 2013, (52 pages).

Patent Cooperation Treaty, "International Preliminary Report on Patentability," issued in connection with Application No. PCT/US2012/067414, Jun. 10, 2014, 6 pages.

United States Patent and Trademark Office, "Non-Final Office Action," issued in connection with U.S. Appl. No. 13/829.625, Oct. 9, 2014, 27 pages.

Bhaduri, Buchendra, et al. "LandScan USA: a high-resolution geospatial and temporal modeling approach for population distribution and dynamics," GeoJournal 69. 1-2, 2007, 15 pages.

Simonneaux, Vincent, et al. "The use of high-resolution image time series for crop classification and evapotranspiration estimate over an irrigated area in central Morocco." International Journal of Remote Sensing 29.1, 2008, 25 pages.

Patent Cooperation Treaty, "International Search Report and Written Opinion," issued in connection with Application No. PCT/US2014/026235, mailed Oct. 24, 2014, 9 pages.

LO, "Modeling the Population of China Using DMSP Operational Linescan System Nighttime Data," Photogrammetric Engineering & Remote Sensing, vol. 67, No. 9, Sep. 2001, 11 pages.

United States Patent and Trademark Office, "Non-Final Office Action," issued in connection with U.S. Appl. No. 13/774,790, Jan. 5, 2014, 45 pages.

Hantula, "Guest Editorial: Evolutionary Psychology and Consumption," Psychology & Marketing, vol. 20(9), Sep. 2003, 8 pages.

Abelson et al., "Targeting Direct Cash Transfers to the Extremely Poor," Aug. 24-27, 2014, 10 pages.

Wan et al., "A New Approach to Image Retrieval with Hierarchical Color Clustering," May 30, 1998, IEEE, 16 pages.

* cited by examiner

METHODS, APPARATUS, AND ARTICLES OF MANUFACTURE TO MEASURE GEOGRAPHICAL FEATURES USING AN IMAGE OF A GEOGRAPHICAL LOCATION

FIELD OF THE DISCLOSURE

This disclosure relates generally to image analysis, and, more particularly, to methods, apparatus, and articles of manufacture to measure geographical features using an image of a geographical location.

BACKGROUND

Manufacturers of goods sometimes wish to measure the market presence of their goods in particular markets to determine markets in which they are under-represented and/or over-represented. Smaller, growing markets are often desirable targets for such studies. As these markets grow larger and/or mature, previous market research becomes obsolete and may be updated and/or performed again.

DETAILED DESCRIPTION

Figure 1:
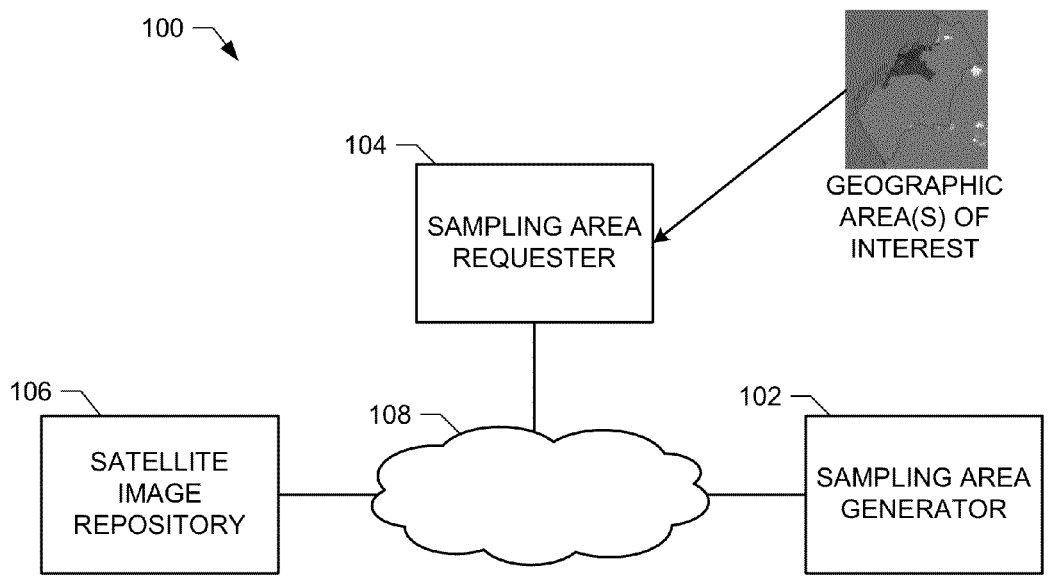
FIG. 1 is a block diagram of an example system to generate sampling areas using images of a geographic area of interest constructed in accordance with the teachings of this disclosure.

Retail Measurement Services (RMS) collect point of sale (POS) and/or other statistics representing sales, inventory, and/or other data about retail stores. The measured retail stores are representative of retail categories to be measured. Known methods of retail measurement include sampling, which avoids the costly efforts involved in enumerating or counting all retail stores in an area being measured. Known sampling methods include drawing sampling areas of a retail market using a local map, taking samples from each area or a subset of these areas, and estimating the retail coverage based on the samples. A Retail Enumeration Survey (RES) is performed prior to producing the RMS data. The RES generates estimates of the number of stores by type, by categories of targeted goods that are carried, and by region.

Due to the high rate of economic, social and/or population growth in some emerging economies, and lack of current and/or accurate maps of the locations measured, sampling and coverage of areas can be incomplete. In addition, a lack of current and/or accurate maps impacts sampling decisions (e.g., by forcing assumptions to be made when determining sampling strategies) which are different between geographic areas (e.g., different countries, cultures, market considerations, etc.). Known techniques of sampling in such conditions can miss significant retail volumes, markets, and/or potential markets present in geographic areas, thereby potentially resulting in inaccurate and/or incomplete retail measurements. Inefficient sampling can add significant cost to a measurement, as sample stratification by an expected number of stores in an area is a difficult challenge. Product marketers desire accurate, consistent, and efficient total coverage of their markets.

Example methods, apparatus, and/or articles of manufacture disclosed herein improve accuracy of sampling, data quality, weighting, and coverage of RES. Example methods, apparatus, and/or articles of manufacture enable standardization of sampling and/or reporting of retail categories by dividing a geographical area of interest into geographic zones having approximately the same size (e.g., standardized sizes). In some such examples, these geographical zones are used as areas in which a discrete sampling activity of one or more retail stores is to take place.

Example methods, apparatus, and/or articles of manufacture disclosed herein use geographical zones for sampling and reporting media and/or retail consumption. In some such examples, digital maps and/or satellite images are used to measure geographic features of an area of interest such as location, development, and/or land use. In some examples, the geographical zones are equal or substantially equal in area (e.g., each geographical zone represents an equal or substantially equal geographical area).

In some examples, the satellite images are used to determine and/or analyze geographical features such as street density, land use, etc., and/or image features such as pixel weight, etc., for each geographical zone in an image of an area of interest. Based on the measurement of the geographical feature and/or image feature, example methods, apparatus, and/or articles of manufacture generate sampling areas to be used to establish various universe estimates for an RES study. Sampling occurring based on these sampling areas may advantageously result in substantially full representation of retail markets within a geographical area of interest and/or in reporting consistent data across different geographical areas. In some examples, the sampling areas specify or approximate a number of geographical zones to be sampled (e.g., in the case of sampling retail stores for a brand owner, specifying geographical zones to be sampled for retail stores, inventory, product availability, etc.).

In some example methods, apparatus, and/or articles of manufacture disclosed herein, a description of the geographical zones is stored in a memory. In some such examples, measurement(s) of geographical features and/or image features associated with the geographical zones are stored in association with the descriptions of the respective geographical zones. Some example methods, apparatus, and/or articles of manufacture disclosed herein generate sampling areas for the geographic area(s) of interest based on the descriptions and the measurements. In some examples, a number of geographical zones within the geographic area(s) of interest are selected to be sampled and the descriptions of the selected geographical zones are provided to a sampling entity which is to perform sampling.

FIG. 1 is a block diagram of an example system 100 to generate sampling areas using one or more images of a geographic area of interest. The example system 100 of FIG. 1 may be used to identify geographical areas to be sampled for an RES study such as a study of retail locations, product availability, and/or any other type of population, data, or market of interest.

As illustrated in FIG. 1, the example system 100 includes a sampling area generator 102, a sampling area requester 104, and a geographic data repository 106. The sampling area generator 102, the sampling area requester 104, and the geographic data repository 106 are communicatively coupled via a network 108. The example network 108 may be a wide-area network such as the Internet.

The example sampling area generator 102 of FIG. 1 receives a request for an identification of one or more sampling areas for a geographic area or region of interest. For example, the sampling area generator 102 may receive a request communicated from the sampling area requester 104 via the network 108. The sampling area generator 102 responds to such a request by retrieving one or more up-to-date (e.g., current or most recent) image(s) of the specified geographic area of interest from the geographic data repository 106. Example satellite and/or aerial image repositories that may be employed to implement the geographic data repository 106 are available from DigitalGlobe®, GeoEye®, RapidEye, Spot Image®, and/or the U.S. National Aerial Photography Program (NAPP). The example geographic data repository 106 may additionally or alternatively include geographic data such as digital map representations, source(s) of population information, and/or external source(s) for parks, road classification, bodies of water, etc.

The example sampling area generator 102 of FIG. 1 receives the requested image(s) covering the requested area and identifies a number of geographical zones within the area. The example sampling area generator 102 of FIG. 1 generates the geographical zones such that each of the zones is approximately the same size (e.g., covers the same amount of area as the other zones). In some examples, the sampling area generator 102 uses the geographical zones as sampling areas. In other examples, the sampling area generator 102 further subdivides the geographical zones as discussed in more detail below. The example sampling area generator 102 of FIG. 1 further determines which geographical zones are to be used as sampling areas.

The sampling area generator 102 of the illustrated example outputs the geographical zones (e.g., outputs identifying descriptions of the geographical zones). In some examples, the geographical zones are output in conjunction with an identification of those geographical zones that are to be sampled (e.g., by a sampler or enumerator). In the illustrated example, the sampling area generator 102 provides the sampling areas to the sampling area requester 104. The sampling area requester 104 may be, for example, a client requesting sampling areas and/or a sampling entity that intends to use the sampling areas to perform sampling services. An example sampling entity may be The Nielsen Company (U.S), LLC, or one of its related entities.

Figure 2:
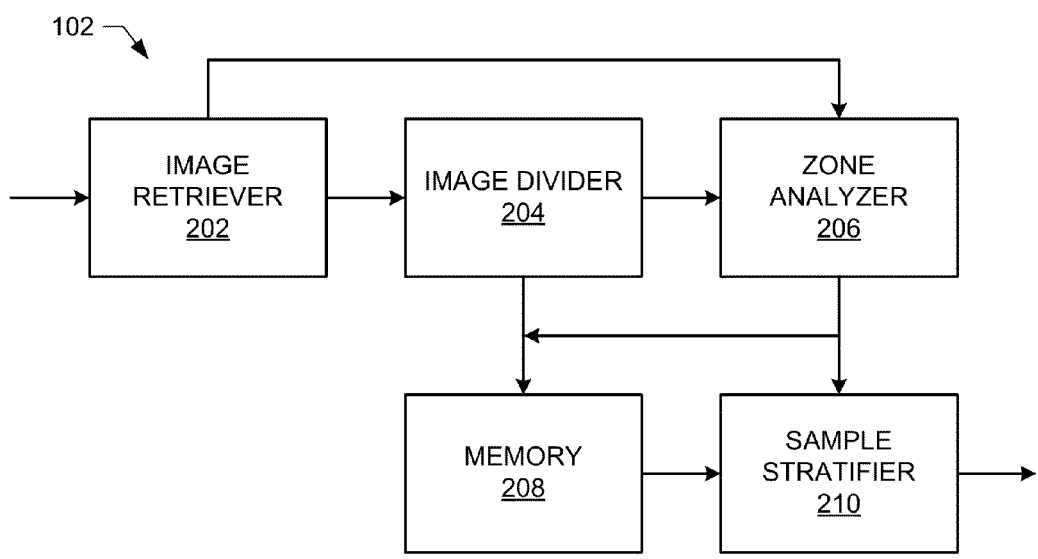
FIG. 2 is a more detailed block diagram of the example sampling area generator of FIG. 1.

FIG. 2 is a more detailed block diagram of the example sampling area generator 102 of FIG. 1. The example sampling area generator 102 of FIG. 2 may be used to generate sampling areas based on one or more image(s) of one or more geographical area(s) of interest. To generate sampling areas, the example sampling area generator 102 of FIG. 2 includes an image retriever 202, an image divider 204, a zone analyzer 206, a memory 208, and a sample stratifier 210.

The example image retriever 202 is coupled to an external network (e.g., the network 108 of FIG. 1) to retrieve one or more image(s) of the geographic area(s) of interest. For example, the image retriever 202 download one or more images of a geographic area of interest from the geographic data repository 106. In some examples, the image retriever 202 specifies one or more set(s) of coordinates (e.g., global positioning system coordinates) defining the geographic area(s) of interest. In other examples, the image retriever 202 identifies an image of the geographic area of interest by identification number, name of the location (e.g., city name), and/or any other method of identifying geographic areas.

The image retriever 202 of the illustrated example receives (e.g., downloads) one or more digital images of the geographic area of interest and provides the image(s) to the image divider 204. The received image(s) include sufficient detail to enable measurement of one or more geographical features of the image. For ease of discussion, this example will refer to a single image. However, the teachings of this disclosure also apply to examples in which multiple whole and/or partial images are provided for the area of interest. The example image divider 204 of FIG. 2 receives the image(s) and divides the image(s) into geographical zones. In the example of FIG. 2, the image divider 204 determines or creates the zones to be substantially the same size (e.g., area). By creating equally-sized zones, the zones may be efficiently and effectively compared using geographical features of the zones that may be readily identifiable via the image. In some examples in which retail stores, product availability, and/or product markets are to be measured using the geographical zones, an advantageous sample size is about 0.04 square kilometers (e.g., 200 meters by 200 meters, 400 meters by 100 meters, etc.). However, different sample sizes and, thus, different geographical zone sizes may be advantageous for different applications.

In some examples, the image divider 204 modifies geographical zones to more closely conform to landmarks and/or geographical locations that are observable by a person located in the area. Such geographical locations may include, for example, intersections and/or addresses of places. The image divider 204 may modify the geographical zones to, for example, avoid providing geographical zones having boundaries that are difficult for a sampler to identify. In some examples, the sizes of the resulting modified geographical zones are not equal to the sizes of the original geographical zones (e.g., substantially uniform zones corresponding to a grid).

As the example image divider 204 of FIG. 2 determines the zones, the image divider 204 generates a description of each zone to distinguish that zone from the other zones. For example, the image divider 204 may describe each zone via a counter by incrementing the counter for each zone and assigning the value of the counter to that zone. In other examples, the image divider 204 describes each zone using the boundaries of the zone expressed in terms of (1) Global Positioning System (GPS) coordinates (e.g., four points in GPS coordinates for a quadrilateral geographical zone, identifying the vertices or corners of the zone), (2) Long Range Navigation (LORAN) time difference (TD) information, and/or (3) any other past, present, and/or future positioning system. The image divider 204 of the illustrated example stores the descriptions of the geographical zones into the memory 208 and/or provides the descriptions of the geographical zones to the zone analyzer 206.

The example zone analyzer 206 of FIG. 2 receives the geographical zones from the image divider 204 and receives the image from the image retriever 202. Using the image and the geographical zones, the example zone analyzer 206 measures one or more geographical feature(s) of the geographic area of interest (e.g., the image) for each of the geographical zones. For example, the image may show the number and/or size(s) of buildings within each geographical zone, the roads in each of the geographical zones, a number of motor vehicles present (e.g., on-road and/or off road), and/or some other indicator that is potentially or actually representative of a population and/or a retail market in the geographical zone. The example zone analyzer 206 of FIG. 2 measures at least one geographical feature for each of the geographical zones. In some examples, the zone analyzer 206 measures the same geographical feature for all of the zones to enable effective comparison of the values of the zones.

In some examples, the zone analyzer 206 measures the linear length of roads within each geographical zone and generates a value equal to the total linear length of the roads. In some other examples, the zone analyzer 206 measures the total area of the roads using the linear length and a width (e.g., a number of lanes for the roads). Such a measurement may be useful in locations where wider roads signify more retail activity and/or, in the case of limited access highways, less retail activity. The zone analyzer 206 then stores the measured value(s) of the feature(s) of interest for each geographical zone in the memory 208 in association with the description of the geographical zone.

The example zone analyzer 206 of FIG. 2 adjusts the measured geographical feature(s) for a zone based on the type of geographical feature(s) and/or based on the presence of certain characteristics of the zone. For example, if a first portion of a zone covers a body of water and a second portion of the zone covers land, the zone analyzer 206 determines the measured geographical feature(s) (e.g., linear length of roads) for the fraction of the second portion. In some examples, the zone analyzer 206 further extrapolates the measurement of the geographical feature(s) to the geographical zone as though the zone did not cover water (e.g., only covered land). For example, if 50% of a zone covered land, the other 50% of the zone covered water, and the measured linear length of roads in the zone was 10 kilometers, the zone analyzer 206 would determine the measurement for the zone as 20 kilometers.

As mentioned above, the example memory 208 of FIG. 2 stores the descriptions of geographical zones and/or values of feature(s) of interest of the zones. For example, the memory 208 stores a record for each of the geographical zones. A record includes one or more fields for the description of the corresponding geographical zone and one or more fields to store one or more measured value(s) determined by the zone analyzer 206 for corresponding feature(s) of interest. In some examples, the memory 208 stores identifiers for each geographical zone in association with the description and/or the value(s). In other examples, the description is used as the identifier of the corresponding zone.

The example sample stratifier 210 of FIG. 2 receives the geographical zone descriptions and the measured and/or calculated values of geographical features of the zones from the memory and/or from the zone analyzer 206. Based on the descriptions and the values, the sample stratifier 210 determines a number geographical zones to be sampled. For example, the sample stratifier 210 may classify the geographical zones into multiple levels or bins based on the measured values. The number of geographical zones to be sampled in each bin may then be determined based on, for example, the numbers of geographical zones in each of the bins and/or the corresponding value(s), range(s) of values, and/or categories of the bin(s). Because the example geographical zones are substantially equal in size, the geographical feature(s) may be compared to estimate a population and/or a market size for the corresponding geographical zones. In some examples, one or more geographical zones have known or closely approximated characteristics from which the sample stratifier 210 estimates populations and/or market sizes of the other zones.

In some examples, the sample stratifier 210 determines the upper and lower limits on the range of values, determines the number of desired levels or bins, and determines the bins based on the upper and lower limits and the number of desired levels or bins. For example, the sample stratifier 210 of the illustrated example makes each bin an equal range of values, a range of percentile values (e.g., the Xth percentile to the Yth percentile, the Yth percentile to the Zth percentile, etc.), and/or a predetermined range of values (equal or unequal in size). In some other examples, the sample stratifier 210 uses predetermined and/or static bins notwithstanding the upper or lower limits of the range of values in the memory 208. In still other examples, the sample stratifier 210 generates bins without a limit on the number of bins, but determines the ranges of the bins based on the groupings of values.

In some examples, the sample stratifier 210 generates a mapping of the geographical zones, the corresponding values, and/or the level or bin classifications. For example, the sample stratifier 210 of the illustrated example generates a heat map illustrating the geographical zones overlaid on the image of the geographic area of interest, where the geographical zones are colored and/or patterned based on the value and/or the level or bin classification of the corresponding geographical zone. The pattern and/or the color corresponds to the bin(s) into which the value(s) associated with the geographical zone fall. The example heat map may advantageously be used to generate a sampling plan, including determining geographical areas are to be sampled.

In some examples, the sampling area generator 102 is used to generate one or more sampling plans having sampling areas. The sampling areas may be the geographical zones and/or, if appropriate, sub-areas of the geographical zones. The sampling plan(s) are then used to sample the sampling areas for numbers of retail stores and/or product or brand availability. The sampling plans may additionally or alternatively be used for other sampling or surveying.

Figure 3A:
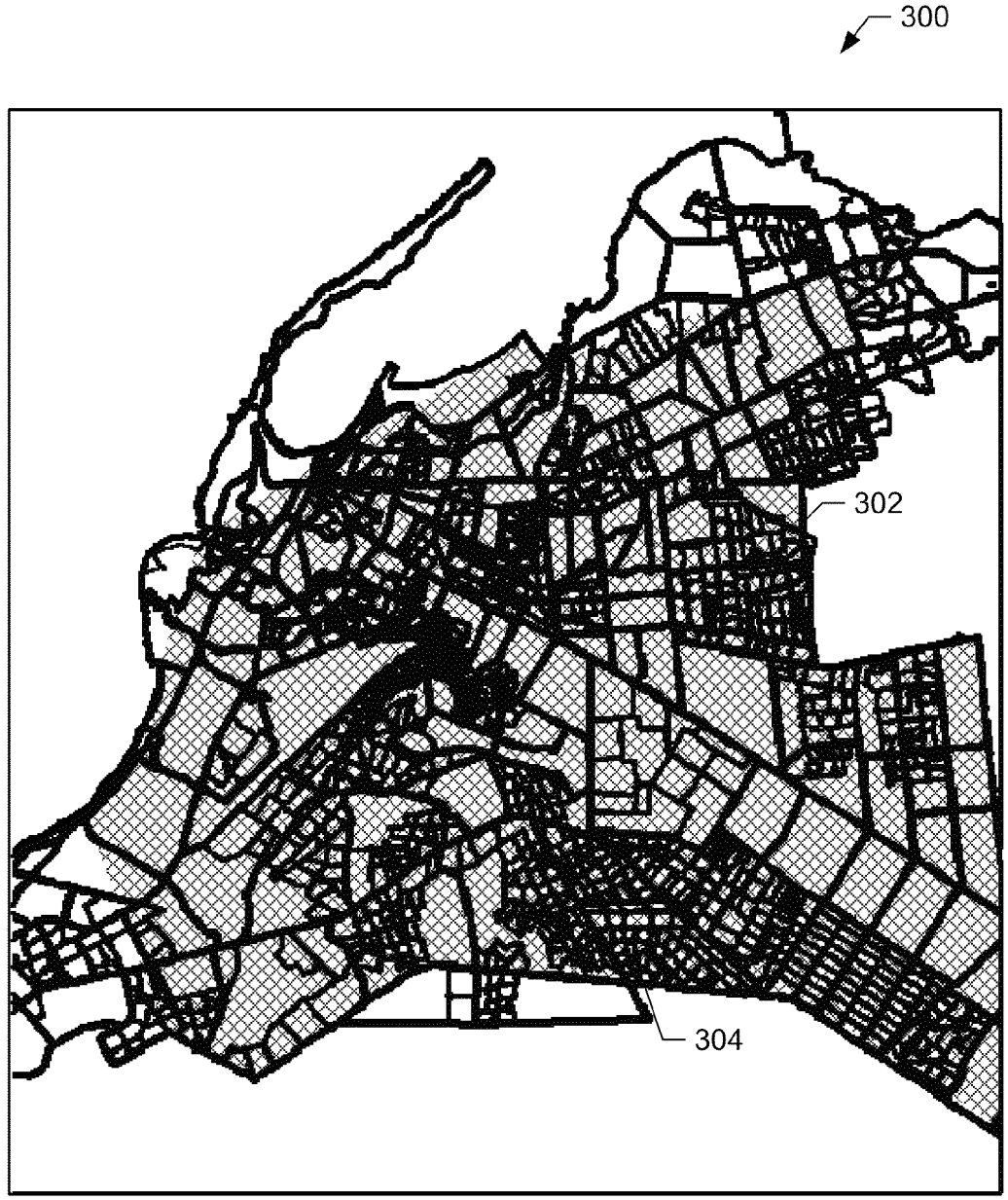
FIGS. 3A-3E illustrate an example satellite image of a geographic area of interest undergoing an example process to generate sampling areas.
Figure 3B:
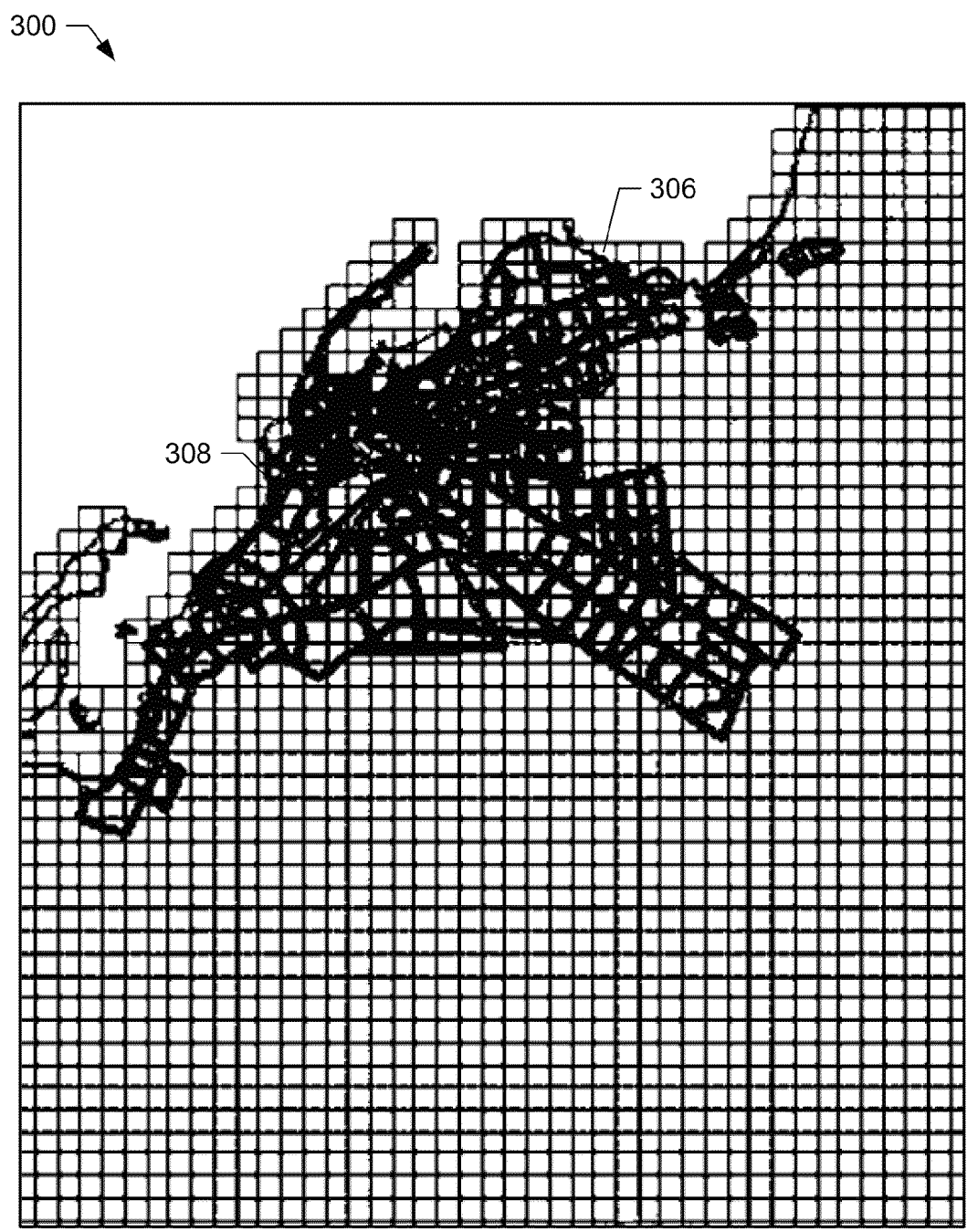
Figure 3C:
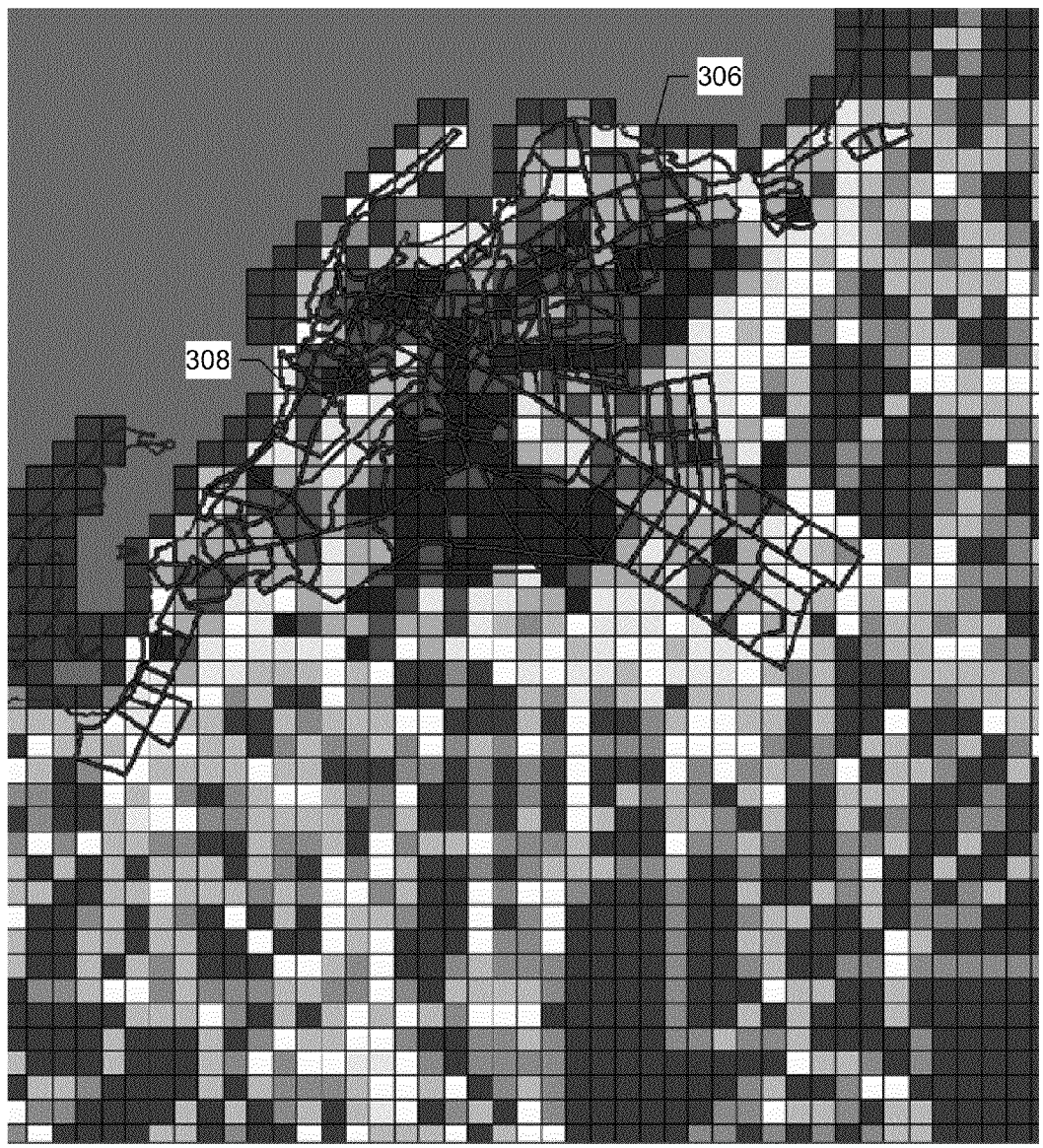

FIGS. 3A-3C illustrate an example satellite image 300 of a geographic area of interest undergoing an example process to generate sampling areas. For example, the sampling area generator 102 of FIG. 2 may generate sampling areas using the example satellite image 300.

FIG. 3A illustrates the example satellite image 300 of a geographic area of interest. The example geographic area of interest illustrated in FIG. 3A is selected as a retail market for which retail statistics about one or more brands and/or markets are to be measured and/or statistically sampled. In some other examples, the geographic area of interest is selected to measure and/or statistically sample another type of activity (e.g., media exposure) and/or population.

The example geographic area of interest illustrated in the image 300 of FIG. 3A includes a number of geographical features 302, 304 that are identifiable and distinguishable within the image 300. In the illustrated example of FIG. 3A, the geographical features 302, 304 include roads within and/or through a geographic area of interest. However, the geographical features 302, 304 may additionally or alternatively include a number of buildings within the geographical zone, a number of motor vehicles within the geographical zone, water presence and area within the geographical zone, a total parks and recreation land area within the geographical zone, a ratio of residential to commercial areas usage within the geographical zone, an industrial land area within the geographical zone, green area within the geographical zone, or parking lot area within the geographical zone, and/or some other indicator and/or combination of indicators from the satellite image and/or any associated geographic data that are potentially or actually representative of a population, a characteristic, and/or a retail market in the corresponding geographical zone. Additionally, the image 300 includes image features such a pixel densities, pixel intensity across multiple wavelengths, edge, and/or straight line detectors, which may be used to replace or supplement the geographical features 302, 304. An example image feature measurement may include determining a density of black pixels (e.g., to measure black roads), white pixels (e.g., to measure commercial building rooftops), etc., in each geographical zone in the image 300.

FIG. 3B illustrates the example satellite image 300 of FIG. 3A divided into geographical zones 306, 308. To more clearly show the example layout of the geographical zones 306, 308, the geographical zones 306, 308 illustrated in FIG. 3B are considerably larger, in terms of area encompassed by the geographical zones, than more advantageous sizes for some applications.

Figure 3D:
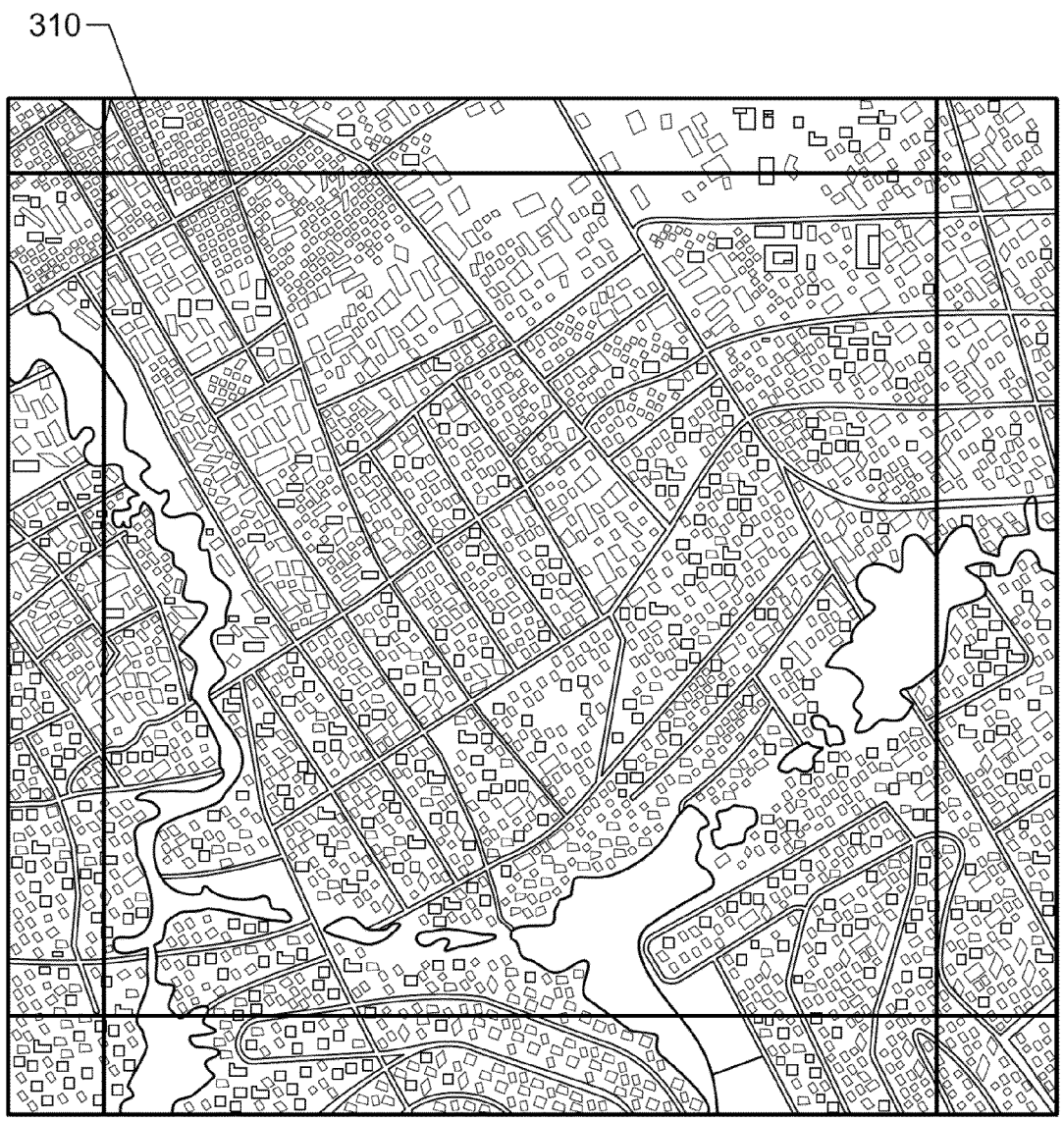

The example satellite image 300 of FIG. 3A may show buildings, roads, waterways, open areas, motor vehicles, and/or other features visible in an aerial and/or satellite photograph. While the image 300 of FIG. 3A is shown in a wider view (e.g., less detail), a more detailed image 310 of a portion (e.g., a geographical zone) of the example satellite image 300 is shown in FIG. 3D, which illustrates example buildings, roads, waterways, and open areas. The example geographical zones 306, 308 may be generated by the image divider 204 of FIG. 2. The geographical zones 306, 308 may be described with reference to their boundaries, translated to the imaged area (e.g., the intersection of A Street and B avenue, the 1000 block of C Boulevard, Landmark D, etc.), and/or with reference to a positioning system (e.g., GPS, LORAN, etc.). The image divider 204 stores descriptions of the geographical zones 306, 308 in the memory 208 of FIG. 2.

The example zone analyzer 206 analyzes each of the geographical zones 306, 308 (and the other geographical zones illustrated in FIG. 3B) to measure the geographical features of interest within the geographical zones 306, 308 as shown in the image 300. In the illustrated example of FIGS. 3A-3C, the zone analyzer 206 measures the linear length of the roads present in each geographical zone 306, 308 and generates a total length value for each geographical zone 306, 308. In other words, the value for the geographical zone 306 is the total linear length of the road(s) and portion(s) of road within the boundaries of the geographical zone 306. Similarly, the value for the geographical zone 308 is the total linear length of the road(s) and portion(s) of road within the boundaries of the geographical zone 308. The zone analyzer 206 stores the value associated with each geographical zone 306, 308 in the memory 208 in association with the description of the geographical zone 306, 308.

FIG. 3C illustrates the example satellite image 300 overlaid with the example geographical zones 306, 308 of FIG. 3B and with indicators representative of the value(s) associated with the feature(s) of interest in each of the geographical zones 306, 308. In the example of FIG. 3C, the sampling stratifier 210 of FIG. 2 has applied different patterns and/or colors to each of the geographical zones corresponding to the value(s) of the feature(s) of interest stored in the memory 208. For example, the geographical zone 306 has a first linear length of road(s) within its boundaries, where the first linear length is classified in a first bin representative of a relatively low total length (e.g., bins 1 or 2 out of 7 total bins). In contrast, the example geographical zone 308 has a second linear length of road(s) within its boundaries, where the second linear length is classified in a second bin representative of a relatively moderate total length (e.g., bins 3, 4, or 5 out of 7 total bins).

Using the image 300 and the classified geographical zones 306, 308 of FIG. 3C, the example sample stratifier 210 determines a sampling plan, which determines the number of zones and/or sub-zones that should be sampled in each of the bins determined by the sampling stratifier. For example, the sample stratifier 210 may determine that more zones should be sampled in the bin represented by the geographical zone 308 than in the bin represented by the geographical zone 306 because a higher value (e.g., a higher linear length of roads) is present in geographical zones like the geographical zone 308 than in geographical zones like the geographical zone 306. The higher linear length of roads indicates a likely higher population or market in these zones and, thus, the overall sample design can be made more efficient due to statistical efficiency occurring via statistical processes such as proportional sampling and/or optimal sampling within strata. In some examples, the sample stratifier 210 further sub-divides some geographical zones to obtain smaller sampling areas for ease of data collection by samplers (e.g., enumerators).

FIG. 3D is an example satellite image of a geographical zone 310 selected from the example satellite image of FIG. 3C. As shown in FIG. 3D, the image of the geographical zone 310 includes representations of roads within the geographical zone 310. Based on the density of the roads in the zone 310 (e.g., a relatively high or low density, a density within a particular range of densities, etc.), sample stratifier 210 selects the example geographical zone 310 for sampling. The sample stratifier 210 sub-divides the geographical zone 310 to obtain sampling areas that are more easily sampled by samplers (e.g., enumerators).

Figure 3E:
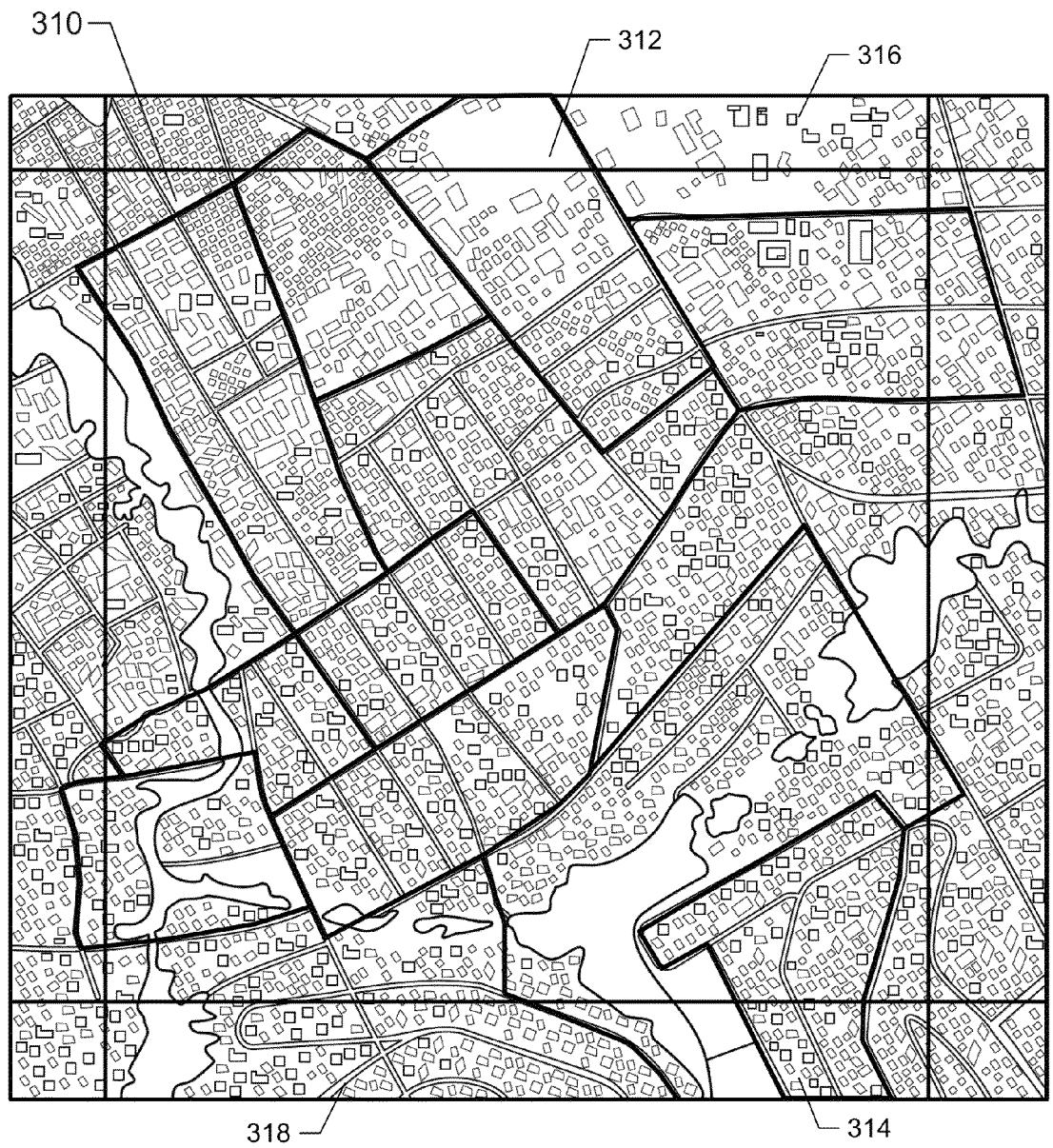

FIG. 3E is a satellite image of the example geographical zone 310 of FIG. 3D including sampling areas 312, 314 sub-divided from the geographical zone 310. In the example of FIG. 3E, the sampling areas 312, 314 are selected to be more easily discernible by a sampler as compared to, for example, the strict borders of the example geographical zone 310 that may be difficult to discern from the street. As shown in FIG. 3E, some of the example sampling areas 312, 314 extend beyond the grid structure of FIGS. 3A-3E. Additionally, portions of example geographical zone 310 are not covered by a sampling area 312, 314. In some examples, the non-covered regions of the zone 310 are covered by sampling areas associated with adjacent geographical zones (e.g., adjacent geographical zones 316, 318). In the example of FIG. 3E, the sampling stratifier 210 selects the illustrated sampling areas to cover approximately the same amount of geographic area as the geographical zone 310.

While example manners of implementing the sampling area generator have been illustrated in FIG. 2, one or more of the elements, processes and/or devices illustrated in FIG. 2 may be combined, divided, re-arranged, omitted, eliminated and/or implemented in any other way. Further, the example image retriever 202, the example image divider 204, the example zone analyzer 206, the example memory 208, the example sample stratifier 210 and/or, more generally, the example sampling area generator 102 of FIG. 2 may be implemented by hardware, software, firmware and/or any combination of hardware, software and/or firmware. Thus, for example, any of the example image retriever 202, the example image divider 204, the example zone analyzer 206, the example memory 208, the example sample stratifier 210 and/or, more generally, the example sampling area generator 102 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example image retriever 202, the example image divider 204, the example zone analyzer 206, the example memory 208, the example sample stratifier 210 are hereby expressly defined to include a tangible computer readable medium such as a memory, DVD, CD, etc. storing the software and/or firmware. Further still, the example sampling area generator 102 of FIG. 2 may include one or more elements, processes and/or devices in addition to, or instead of, those illustrated in FIG. 2, and/or may include more than one of any or all of the illustrated elements, processes and devices.

Figure 4:
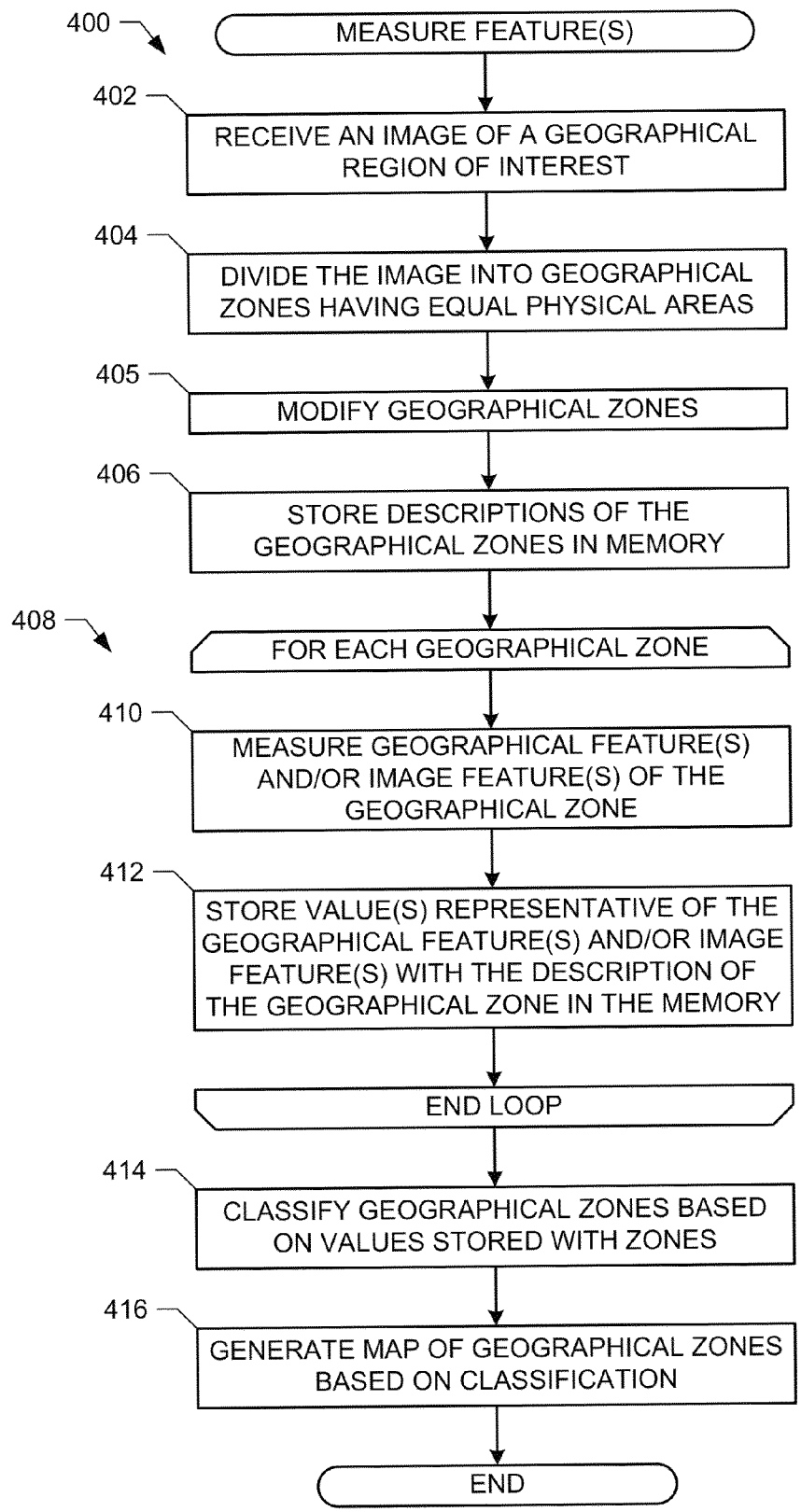
FIG. 4 is a flowchart illustrating example machine readable instructions which may be executed to implement the example sampling area generator to measure geographical features using an image of a geographical location.
Figure 5:
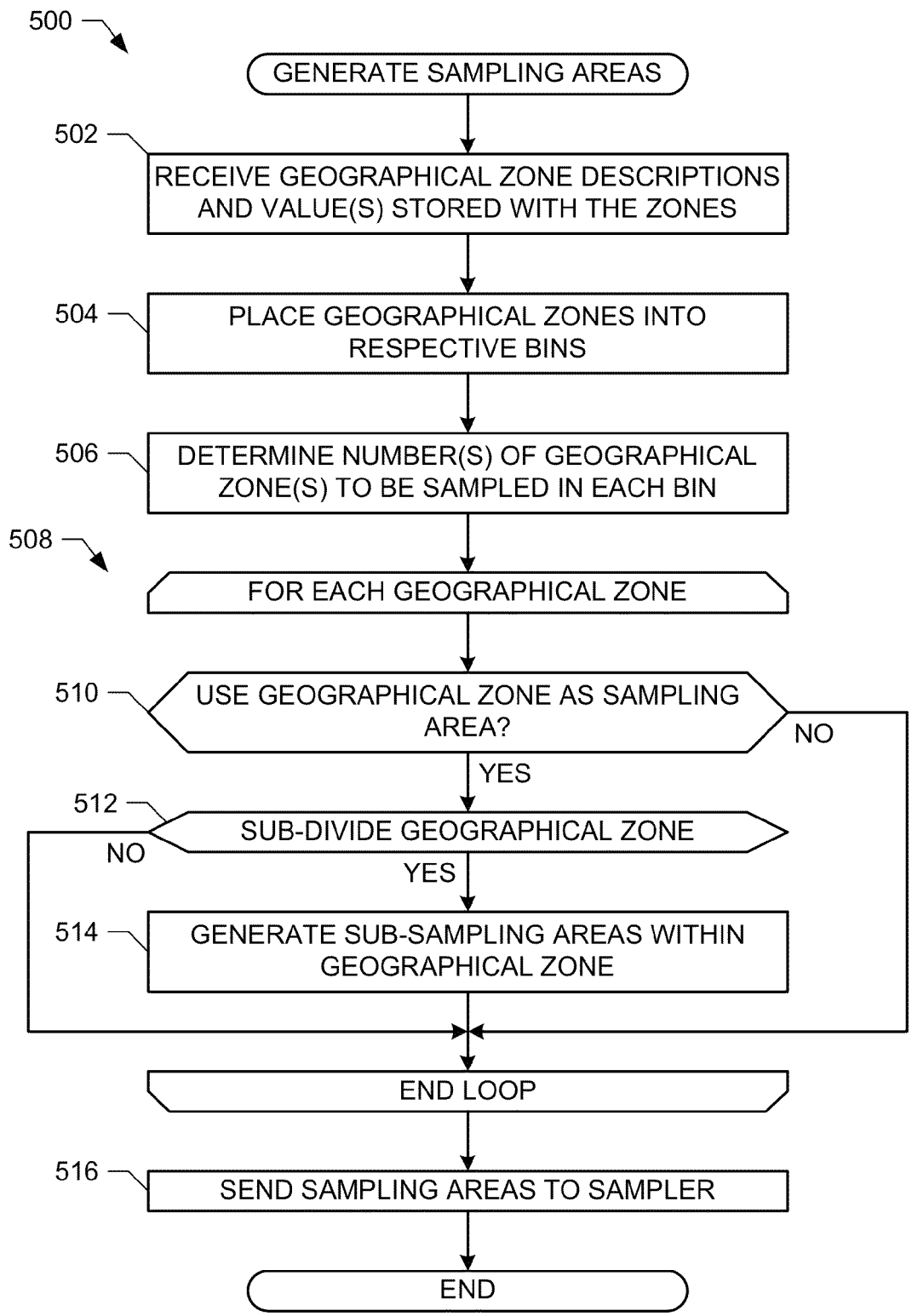
FIG. 5 is a flowchart illustrating example machine readable instructions which may be executed to implement the example sampling area generator of FIGS. 1 and/or 2 to generate sampling areas based on measured geographical features.

Flowcharts representative of example machine readable instructions for implementing the sampling area generator 102 of FIG. 2 are shown in FIGS. 4 and 5. In these examples, the machine readable instructions comprise program(s) for execution by a processor such as the processor 612 shown in the example processor platform 600 discussed below in connection with FIG. 6. The program may be embodied in software stored on a tangible computer readable medium such as a CD-ROM, a floppy disk, a hard drive, a digital versatile disk (DVD), or a memory associated with the processor 612, but the entire program and/or parts thereof could alternatively be executed by a device other than the processor 612 and/or embodied in firmware or dedicated hardware. Further, although the example program(s) are described with reference to the flowcharts illustrated in FIGS. 4 and 5, many other methods of implementing sampling area generator 102 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4 and 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 4 is a flowchart representative of example machine readable instructions 400 which may be executed to implement the example sampling area generator 102 of FIGS. 1 and 2 to measure one or more geographical feature(s) present in an image of a geographical location.

The example instructions 400 begin by receiving an image of a geographical area of interest (block 402). For example, the image retriever 202 of FIG. 2 may request and receive an image (e.g., the image 300 of FIG. 3A) via the network 108 of FIG. 1. In the example of FIG. 4, the image is sufficiently detailed to distinguish geographical features of interest in the region. The image divider 204 of FIG. 2 divides the image into geographical zones which have equal or approximately equal physical areas (block 404). For example, the image divider 204 divides the image 300 into geographical zones 306, 308.

The example image divider 204 modifies the geographical zones (block 405). For example, the image divider 204 may modify one or more of the geographical zones to more closely conform to landmarks and/or geographical locations that are observable by a person located in the area. Such geographical locations may include, for example, intersections and/or addresses of places. The image divider 204 stores descriptions of the geographical zones 306, 308 into the example memory 208 of FIG. 2 (block 406).

The example instructions 400 enter a loop 408 to process each of the example geographical zones 306, 308 in the memory 208. For the geographical zone 306 of FIG. 3B, the zone analyzer 206 measures geographical feature(s) and/or image feature(s) of the geographical zone 306 (block 410). In the example of FIGS. 3B and 3C, the zone analyzer 206 measures the total linear length of roads and portion(s) of roads that lie within the geographical zone 306. In some examples, the zone analyzer 206 extrapolates the measured value(s) based on a characteristic or feature of the geographical zone 306. The zone analyzer 206 stores value(s) representative of the measured geographical feature(s) and/or image feature(s) in the memory 208 with the description of the corresponding geographical zone 306 (block 412). For example, the zone analyzer 206 may store the total linear road length for the geographical zone 306 in a record in memory 208 containing the description of the geographical zone 306. After block 412, the example instructions 400 iterate the loop 408 (e.g., blocks 410 and 412) for the next geographical zone (e.g., the geographical zone 308) until all or a desired number of the geographical zones have been processed by the loop 408.

After processing the example geographical zones, the example sampling stratifier 210 of FIG. 2 classifies the geographical zones 306, 308 based on the values stored with the zones (block 414). For example, the sampling stratifier 210 receives records from the memory 208, including the descriptions and values for each of the geographical zones 306, 308, and determines levels or bins into which the values may fall. In some examples, the sample stratifier 210 determines the upper and lower limits on the range of values, determines the number of desired levels or bins, and determines the bins based on the upper and lower limits and the number of desired levels or bins. For example, the sample stratifier 210 may make each bin an equal range of values, a range of percentile values (e.g., the Xth percentile to the Yth percentile, the Yth percentile to the Zth percentile, etc.), a predetermined range of values (equal or unequal in size), and/or any other range or division. In some other examples, the sample stratifier 210 uses predetermined and/or static bins notwithstanding the upper or lower limits of the range of values in the memory 208.

The example sample stratifier 210 generates a map of geographical zones based on the classification (block 416). An example map generated by the sample stratifier 210 is a heat map showing each geographical zone (which may be laid over the image), each geographical zone including a pattern and/or a color. The pattern and/or the color corresponds to the bin(s) into which the value(s) associated with the geographical zone falls. As illustrated in the example heat map of FIG.

3C, the geographical zones 306, 308 include respective patterns to visually illustrate the value range of the corresponding geographical zones 306, 308.

FIG. 5 is a flowchart representative of example machine readable instructions 500 which may be executed to implement the example sampling area generator 102 of FIGS. 1 and 2 to generate areas to be sampled.

The example instructions 500 of FIG. 5 begin by receiving (e.g., at the sampling stratifier 210 of FIG. 2) geographical zone descriptions and value(s) stored with the descriptions (block 502). For example, the sampling stratifier 210 may receive the zone descriptions and value(s) from the image divider 204, the zone analyzer 206, the memory 208, and/or a combination thereof. Based on the values, the example sampling stratifier 210 places the geographical zones into respective bins (block 504). For example, the sample stratifier 210 may determine upper and lower limits on a range of values for each bin, determine the number of desired levels or bins, and determine the bins based on the upper and lower limits and the number of desired levels or bins.

The example sample stratifier 210 determines the number(s) of geographical zone(s) to be sampled from each bin (block 506). The numbers of zones to be sampled from a bin may be based on, for example, the number of zones in the bin and/or the ranges of values for the bin.

The example instructions 500 then enter a loop 508 for each of the received geographical zones. For example, the sampling stratifier 210 may perform the loop 504 for each of the geographical zones received in block 502.

For the example geographical zone 306 of FIG. 3B, the sampling stratifier 210 determines whether to use the geographical zone 306 as a sampling area (block 510). The determination may be made based on, for example, whether a threshold number of geographical zones have been selected for sampling from the same bin as the geographical zone under consideration, other geographic criteria that make the geographical zone representative of one or more other geographical zone(s), and/or a random or pseudorandom factor.

If the geographical zone is to be used as a sampling area (block 510), the example sampling stratifier 210 whether the geographical zone 306 is sufficiently-highly populated and/or geographically large enough to sub-divide the geographical zone 306 (block 512). Sub-dividing may be performed if, for example, sampling the entire geographical zone 306 would be substantially inconvenient or impractical for the sampler. If the sampling stratifier 210 determines that geographical zone 306 is to be subdivided (block 512), the example sampling stratifier 210 generates sub-sampling area(s) within the geographical zone 306 (block 514). While each of the example sub-sampling areas is independently sampled, the sub-sampling areas are considered to be within the sampling area 306. The number of sampling area(s) in the geographical zone 306 may be based on the value associated with the geographical zone 306. Generally speaking, a higher value will result in more sub-sampling areas being generated within the geographical zone 306.

In some examples, the sampling stratifier 210 generates a number of sub-sampling areas such that the value divided by the number of sampling areas yields a quotient less than the threshold. In some other examples, the sampling stratifier 210 repeatedly divides the geographical zones into sub-sampling areas, sub-sampling areas into sub-sub-sampling areas, etc., until each of the sub-sampling area(s), sub-sub-sampling area(s), etc., having a value less than the threshold. To this end, the example sample stratifier 210 iterates with the example zone analyzer 206 to measure geographical feature(s) of the sub-sampling areas, the sub-sub-sampling areas, etc., and then compare(s) the value(s) determined by the measurement to the threshold.

After subdividing the geographical zone (block 514), if the sampling stratifier 210 determines not to sub-divide the geographical zone (block 512), or the geographical zone is not to be used as a sampling area (block 510), the example sampling stratifier 210 iterates the loop 504 for the next geographical zone.

When the geographical zones have been processed via the loop 508, the example sampling stratifier 210 sends the sampling areas to a sampler (block 516). For example, the sampling areas may be sent to the sampler in the form of a map including the boundaries of the sampling areas. The sampler may be another entity responsible for physically sampling the sampling areas such as, for example, a retail enumeration service in the case of sampling retail markets and/or brands. In some examples, the sampler decides and/or reviews the sampling areas to determine a different set of sampling areas from the geographical zones.

After sending the sampling areas (block 516), the example instructions 500 may end. Alternatively, the instructions 500 may iterate for another set of geographical zone descriptions (e.g., another geographic area of interest).

Figure 6:
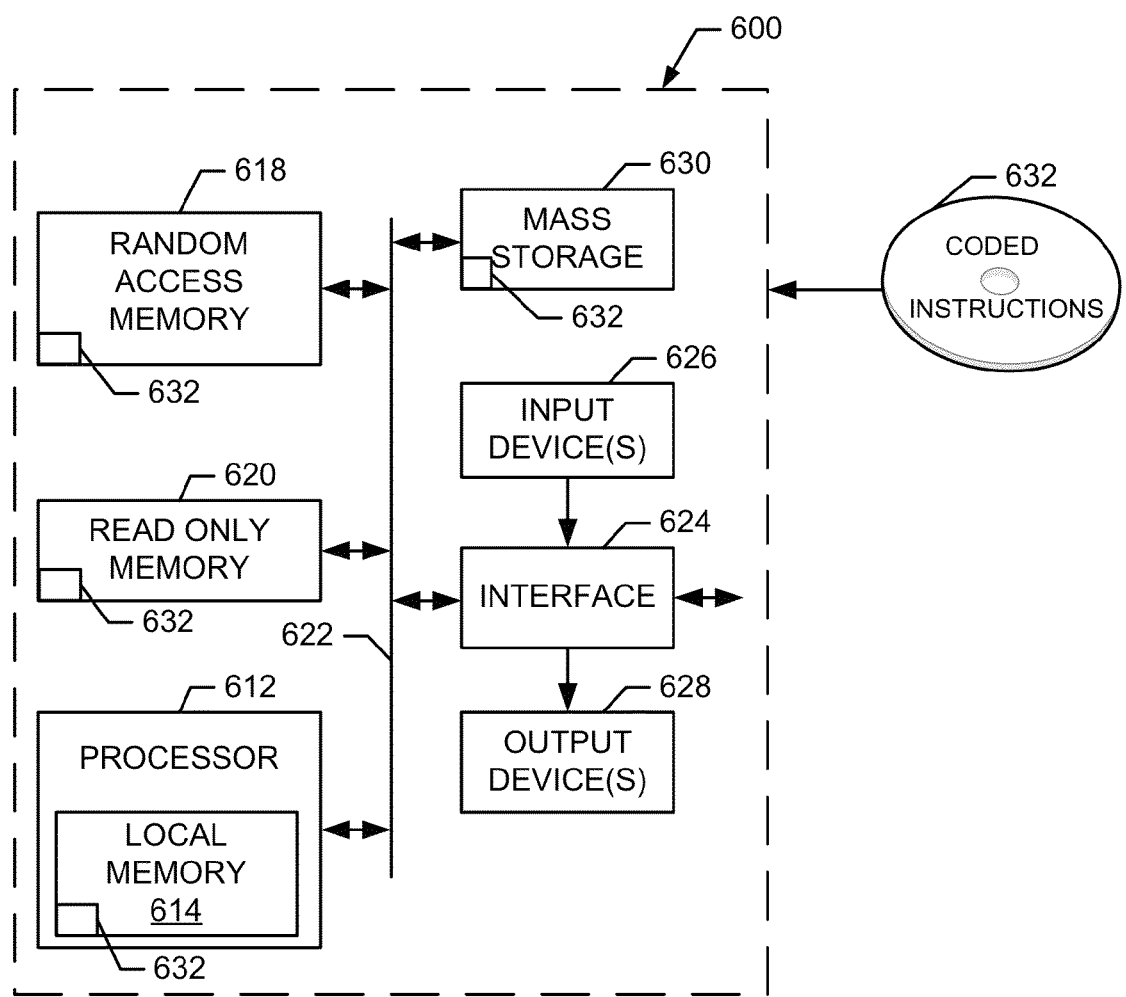
FIG. 6 is a block diagram of an example processor platform capable of executing the instructions of FIGS. 4-5 to implement the sampling area generator of FIGS. 1 and 2.

FIG. 6 is a block diagram of an example processor system 600 that may execute, for example, the machine-readable instructions of FIGS. 4-5 to implement the example sampling area generator 102 of FIGS. 1 and/or 2. The processor system 600 can be, for example, a server, a personal computer, an internet appliance, an audience measurement device, and/or any other type of computing device.

The processor system 600 of the instant example includes a processor 612. For example, the processor 612 can be implemented by one or more Intel® microprocessors. Of course, other processors from other entities are also appropriate. The example processor 612 includes a local memory 614.

The processor 612 is in communication with a main memory including a volatile memory 618 and a non-volatile memory 620 via a bus 622. The volatile memory 618 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory is typically controlled by a memory controller.

The processor system 600 also includes an interface circuit 624. The interface circuit 624 may be implemented by any type of interface standard, such as an Ethernet interface, a universal serial bus (USB), and/or a PCI express interface.

One or more input devices 626 are connected to the interface circuit 624. The input device(s) 626 permit a user to enter data and commands into the processor 612. The input device(s) can be implemented by, for example, a keyboard, a mouse, a touchscreen, a track-pad, a trackball, isopoint and/or a voice recognition system.

One or more output devices 628 are also connected to the interface circuit 624. The output devices 628 can be implemented, for example, by display devices (e.g., a liquid crystal display, a cathode ray tube display (CRT), a printer and/or speakers). The interface circuit 624, thus, typically includes a graphics driver card.

The interface circuit 624 also includes a communication device such as a modem or network interface card to facilitate exchange of data with external processor systems via a network (e.g., an Ethernet connection, a digital subscriber line (DSL), a telephone line, coaxial cable, a cellular telephone system, a Bluetooth connection, etc.).

The processor system 600 also includes one or more mass storage devices 630 for storing software and data. Examples of such mass storage devices 630 include floppy disk drives, hard drive disks, compact disk drives, and digital versatile disk (DVD) drives. The mass storage device 630 may implement the example memory 208 of FIG. 2.

The coded instructions 632 of FIGS. 4-5 may be stored in the mass storage device 630, in the volatile memory 618, in the non-volatile memory 620, in the local memory 614, and/or on a removable storage medium such as a CD or DVD.

From the foregoing, it will be appreciated that methods, apparatus and/or articles of manufacture disclosed herein may be used to measure geographical feature(s) of a geographic area of interest. Example methods, apparatus, and/or articles of manufacture advantageously improve accuracy in retail sampling, thereby improving data quality and coverage. Additionally, example methods, apparatus, and/or articles of manufacture disclosed herein standardize sampling and reporting of retail categories, thereby reducing variance in statistical sampling and improving overall statistical quality. By covering more of the geographical area of interest, example methods, apparatus, and/or articles of manufacture disclosed herein can provide more accurate retail data for retail markets. Disclosed example methods, apparatus, and/or articles of manufacture are able to more rapidly and completely sample a market than known retail sampling techniques, and rapidly deliver measurement of newly-developed markets or market areas within a geographic area of interest. Additionally, example methods, apparatus, and/or articles of manufacture disclosed herein can provide clients more current and/or relevant retail data, to better inform the client's marketing decisions as to the area of interest.

Although certain example methods, apparatus and/or articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A tangible computer readable medium comprising machine readable instructions which, when executed, cause a machine to at least:
   divide an image of a geographic area of interest into a plurality of geographical zones, the geographical zones being representative of different geographical areas having approximately equal physical areas;
   measure a geographical feature represented in the image for corresponding ones of the plurality of geographical zones;
   store descriptions for the geographical zones in a computer memory;
   store values representative of the geographical feature of the geographical zones;
   sort the geographical zones into bins based on a comparison of the values to ranges of values, the ranges of values corresponding to the bins; and
   determine a number of zones to be sampled in one of the bins based on the range of values corresponding to the one of the bins.

2. A method, comprising:
   dividing, with a processor, an image of a geographic area of interest into a plurality of geographical zones, the geographical zones being representative of different geographical areas having approximately equal physical areas;
   measuring, with the processor, a geographical feature represented in the image for corresponding ones of the plurality of geographical zones;
   storing descriptions for the geographical zones in a computer memory;
   storing values representative of the geographical feature of the geographical zones;
   sorting the geographical zones into bins based on a comparison of the values to ranges of values, the ranges of values corresponding to the bins; and
   determining a number of zones to be sampled in one of the bins based on the range of values corresponding to the one of the bins.

3. A method as defined in claim 2, wherein the geographical feature is representative of a population or a market within the geographical zone.

4. A method as defined in claim 2, wherein the geographical feature comprises at least one of a total linear length of roads within the geographical zone, a number of buildings within the geographical zone, a number of motor vehicles within the geographical zone, water presence and area within the geographical zone, a total parks and recreation land area within the geographical zone, a ratio of residential to commercial areas usage within the geographical zone, an industrial land area within the geographical zone, green area within the geographical zone, or parking lot area within the geographical zone.

5. A method as defined in claim 2, further, comprising generating a map based on the values and the zones.

6. A method as defined in claim 5, further comprising using the map to determine numbers of geographical zones to be sampled.

7. A method as defined in claim 5, wherein the map is representative of a number of bins into which the zones are classified.

8. An apparatus, comprising:
   an image divider to divide an image of a geographic area of interest into a plurality of geographical zones;
   a zone analyzer to measure a geographical feature of a first one of the plurality of geographical zones based on a feature in the image, wherein the geographical feature is representative of a potential market within the geographical zone;
   a memory to store a description of the first geographical zone with a value representative of the geographical feature of the first geographical zone; and
   a sample stratifier to:
   sort the geographical zones into bins based on a comparison of the values to ranges of values, the ranges of values corresponding to the bins; and
   determine a number of zones to be sampled in one of the bins based on the range of values corresponding to the one of the bins.

9. An apparatus as defined in claim 8, further comprising a memory to store a description of the first geographical zone with a value representative of the geographical feature of the first geographical zone.

10. An apparatus as defined in claim 8, wherein the sample stratifier is to determine a geographical zone to be sampled based on the value and the zones.

11. A tangible computer readable medium as defined in claim 1, wherein the geographical feature is representative of a population or a market within the geographical zone;

store descriptions for the geographical zones in a computer memory; and store values representative of the geographical feature of the geographical zones.

12. An apparatus as defined in claim 8, wherein the geographical feature is representative of a population within the geographical zone.

13. A tangible computer readable medium as defined in claim 1, wherein the geographical feature comprises a total linear length of roads within the geographical zone.

14. A tangible computer readable medium as defined in claim 1, whereint he instructions further cause the machine to at least generate a map based on the values and the zones.

15. A tangible computer readable medium as defined in claim 14, wherein the instructions further cause the machine to at least use the map to determine numbers of geographical zones to be sampled.

16. A tangible computer readable medium as defined in claim 14, wherein the map is representative of a number of bins into which the zones are classified.

* * * * *

UNITED STATES PATENT AND TRADEMARK OFFICE
CERTIFICATE OF CORRECTION

| | | |
|---|---|---|
| PATENT NO. | : 9,002,114 B2 | |
| APPLICATION NO. | : 13/314989 | |
| DATED | : April 7, 2015 | |
| INVENTOR(S) | : Miller et al. | |

It is certified that error appears in the above-identified patent and that said Letters Patent is hereby corrected as shown below:

In the claims,
Column 15, line 12: replace "whereint he" with --wherein the--

Signed and Sealed this
Fifteenth Day of March, 2016

Michelle K. Lee
*Director of the United States Patent and Trademark Office*